US011513972B2

(12) United States Patent
Chen et al.

(10) Patent No.: US 11,513,972 B2
(45) Date of Patent: *Nov. 29, 2022

(54) TLB DEVICE SUPPORTING MULTIPLE DATA STREAMS AND UPDATING METHOD FOR TLB MODULE

(71) Applicant: Cambricon Technologies Corporation Limited, Beijing (CN)

(72) Inventors: Tianshi Chen, Beijing (CN); Qi Guo, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,351

(22) Filed: Aug. 12, 2019

(65) Prior Publication Data

US 2019/0361816 A1 Nov. 28, 2019

Related U.S. Application Data

(63) Continuation of application No. 16/286,361, filed on Feb. 26, 2019, now Pat. No. 10,474,586, which is a (Continued)

(30) Foreign Application Priority Data

Aug. 26, 2016 (CN) .......................... 201610738487.2

(51) Int. Cl.
*G06F 12/1027* (2016.01)
*G06N 3/02* (2006.01)

(52) U.S. Cl.
CPC ........... *G06F 12/1027* (2013.01); *G06N 3/02* (2013.01); *G06F 2212/68* (2013.01)

(58) Field of Classification Search
CPC .... G06F 12/1027; G06F 2212/68; G06N 3/02
See application file for complete search history.

(56) References Cited

U.S. PATENT DOCUMENTS 5,574,877 A * 11/1996 Dixit ................... G06F 12/1027
711/207
6,205,531 B1 3/2001 Hussain
(Continued)

FOREIGN PATENT DOCUMENTS

CN 101346706 A 1/2009
CN 101346707 A 1/2009
(Continued)

OTHER PUBLICATIONS

CN201610266970.5, Official Action dated Jan. 6, 2020, 9 Pages (No English translation).
(Continued)

*Primary Examiner* — Prasith Thammavong
(74) *Attorney, Agent, or Firm* — Getech Law LLC; Jun Ye

(57) ABSTRACT

Aspects of managing Translation Lookaside Buffer (TLB) units are described herein. The aspects may include a memory management unit (MMU) that includes one or more TLB units and a control unit. The control unit may be configured to identify one from the one or more TLB units based on a stream identification (ID) included in a received virtual address and, further, to identify a frame number in the identified TLB unit. A physical address may be generated by the control unit based on the frame number and an offset included in the virtual address.

18 Claims, 8 Drawing Sheets

Related U.S. Application Data continuation-in-part of application No. PCT/CN2017/095845, filed on Aug. 3, 2017.

(56) References Cited

U.S. PATENT DOCUMENTS

| | | | | |
|---|---|---|---|---|
| 10,474,586 | B2* | 11/2019 | Chen | G06F 12/1036 |
| 2002/0065867 | A1* | 5/2002 | Chauvel | G06F 12/0891 |
| | | | | 718/104 |
| 2003/0061434 | A1* | 3/2003 | Yiu | G11C 15/00 |
| | | | | 711/1 |
| 2004/0160960 | A1* | 8/2004 | Monta | H04N 19/436 |
| | | | | 370/395.4 |
| 2010/0274987 | A1* | 10/2010 | Subrahmanyam | G06F 12/1036 |
| | | | | 711/207 |
| 2011/0060942 | A1* | 3/2011 | Vorbach | G06F 13/1663 |
| | | | | 714/6.2 |
| 2012/0226888 | A1 | 9/2012 | Rychlik et al. | |
| 2015/0199279 | A1* | 7/2015 | Haugan | G06F 12/1009 |
| | | | | 711/133 |
| 2015/0261474 | A1* | 9/2015 | Vorbach | G06F 3/0647 |
| | | | | 710/52 |
| 2016/0140050 | A1* | 5/2016 | Kujtkowski | G06F 12/1009 |
| | | | | 711/108 |
| 2016/0259735 | A1* | 9/2016 | Evans | G06F 12/1036 |
| 2016/0378682 | A1* | 12/2016 | Sander | G06F 12/1027 |
| | | | | 711/135 |
| 2018/0246816 | A1* | 8/2018 | Smith | G06F 12/1081 |

FOREIGN PATENT DOCUMENTS

| | | |
|---|---|---|
| CN | 102163320 A | 8/2011 |
| CN | 103443777 A | 12/2013 |
| CN | 104375950 A | 2/2015 |
| CN | 105653790 A | 6/2016 |
| CN | 106663061 A | 5/2017 |
| WO | 2016028711 A1 | 2/2016 |

OTHER PUBLICATIONS

EP17842787A, European Search Report dated Mar. 20, 2020, 3 pages.
EP 17842787.8—Communication Pursuant to Article 94(3) EPC, mailed Jun. 15, 2020, 5 pages.
EP 17842787.8—Response to Communication Pursuant to Article 94(3) EPC, filed Mar. 1, 2021, 45 pages.
EP 17842787.8—Response to Communication pursuant to Rules 161(2) and 162 EPC, filed Oct. 1, 2019, 50 pages.
CN 201911001839.6, First Office Action, dated Jun. 23, 2021, 22 pages, (with English translation).
CN 201911001876.7, First Office Action, dated Jul. 21, 2021, 17 pages, (with English translation).
KR 10-2018-7034255, Notification of Reason for Refusal, dated May 9, 2021, 30 pages, (with English translation).
TW 106127835, Office Action, dated Dec. 8, 2021, 9 pages, (with brief English explanation).
EP 17 842 787.8, Communication pursuant to Article 94(3) EPC, mailed Jul. 27, 2021, 4 pages.
CN 201610738487.2—First Office Action, dated Aug. 14, 2019, 14 pages. (with brief English explanation).
CN 201610738487.2—Second Office Action, dated Oct. 24, 2019, 11 pages. (with brief English explanation).
PCT/CN2017/095845—International Search Report, dated Sep. 27, 2017, 15 pages, (with brief English explanation).

* cited by examiner

800

Receiving, by a control unit, a virtual address that includes a stream ID, a virtual page number, and an offset, wherein the stream ID identifies one of multiple data types.

↓ 802

Identifying, by the control unit, one of one or more TLB units that corresponds to the stream ID in the virtual address.

↓ 804

Determining a TLB hit when one of the plurality of page numbers in the identified TLB unit matches the virtual page number.

↓ 806

Identifying, by the control unit based on the determination of the TLB hit, one of the plurality of page numbers that corresponds to the virtual page number in the virtual address.

↓ 808

Identifying, by the control unit, the frame number that corresponds to the identified page number.

↓ 810

Generating, by the control unit, a physical address that includes the frame number and the offset.

TLB DEVICE SUPPORTING MULTIPLE DATA STREAMS AND UPDATING METHOD FOR TLB MODULE

BACKGROUND

MMUs, by mapping of virtual addresses to physical addresses, may increase the total size of data stacks to exceed the size of a physical memory. An MMU's page table, e.g., a conversion table of virtual addresses and physical addresses, may be stored in a memory. Since the conversion from a virtual address to a physical address requires multiple accesses to memory, the performance of data access is greatly reduced. A TLB unit may be provided to improve the efficiency of data access. The TLB unit stores a part of page entries retrieved from the page table. When a data process device sends a virtual address, MMU first accesses the TLB unit. If the TLB unit contains the page which may be used to convert this virtual address, this page is used to generate the physical address. If the TLB unit does not include the page indicated by the virtual address, MMU may access the page table in the memory to find the page of corresponding address and update this page into the TLB unit. Thus, TLB units may reduce the frequency of accessing the memory, largely improve the performance of data access.

However, conventional TLB units may not work for streaming applications such as data streams in artificial neural networks. The data streams in artificial neural networks may include multiple consecutive virtual addresses and only accessing each corresponding page once in a period. As such, TLB misses may frequently occur in conventional TLB units and the MMU may access the memory to retrieve the corresponding page. Therefore, for streaming applications, conventional TLB units may not improve the performance of data access.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for managing TLB units. The example apparatus may include one or more TLB units. Each of the TLB units may correspond to a data type and include a plurality of pages and a plurality of frames that respectively correspond to the plurality of pages. Each of the plurality of pages may be associated with a page number and each of the plurality of frames may be associated with a frame number that indicates a range in a physical storage space. The example apparatus may further include a control unit configured to receive a virtual address that includes a stream identification (ID), a virtual page number, and an offset, wherein the stream ID identifies one of the multiple data types.

Further, the control unit may be configured to identify the TLB unit that corresponds to the stream ID in the virtual address based on the data type indicated by the stream ID and determine a TLB hit when one of the plurality of page numbers in the identified TLB unit matches the virtual page number in the virtual address. The control unit may then identify one of the plurality of page numbers that corresponds to the virtual page number in the virtual address and identify the frame number that corresponds to the identified page number. Further, the control unit may be configured to generate a physical address that includes the frame number and the offset.

Another example aspect of the present disclosure provides an exemplary method for managing TLB units. The example method may include receiving, by a control unit, a virtual address that includes a stream ID, a virtual page number, and an offset, wherein the stream ID identifies one of multiple data types; identifying, by the control unit, one of one or more TLB units that corresponds to the stream ID in the virtual address; determining a TLB hit when one of the plurality of page numbers in the identified TLB unit matches the virtual page number; identifying, by the control unit based on the determination of the TLB hit, one of the plurality of page numbers that corresponds to the virtual page number in the virtual address; identifying, by the control unit, the frame number that corresponds to the identified page number; and generating, by the control unit, a physical address that includes the frame number and the offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 illustrates a flow chart of an example method for TLB management.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Streaming applications such as data streams in artificial neural networks may be categorized based on different data types. For example, data streams in artificial neural networks may be categorized into streams respectively for input data, output data, weight values, and partial sums. Other streaming applications may include more data types. Based on the count of the data types, an MMU may include one or more TLB units respectively corresponding to each of the data types. Further, the MMU may be configured to update the entries in the TLB units with consecutive page numbers. As such, the TLB hit rate may be improved and the overall efficiency of data access may also be improved.

Figure 1:
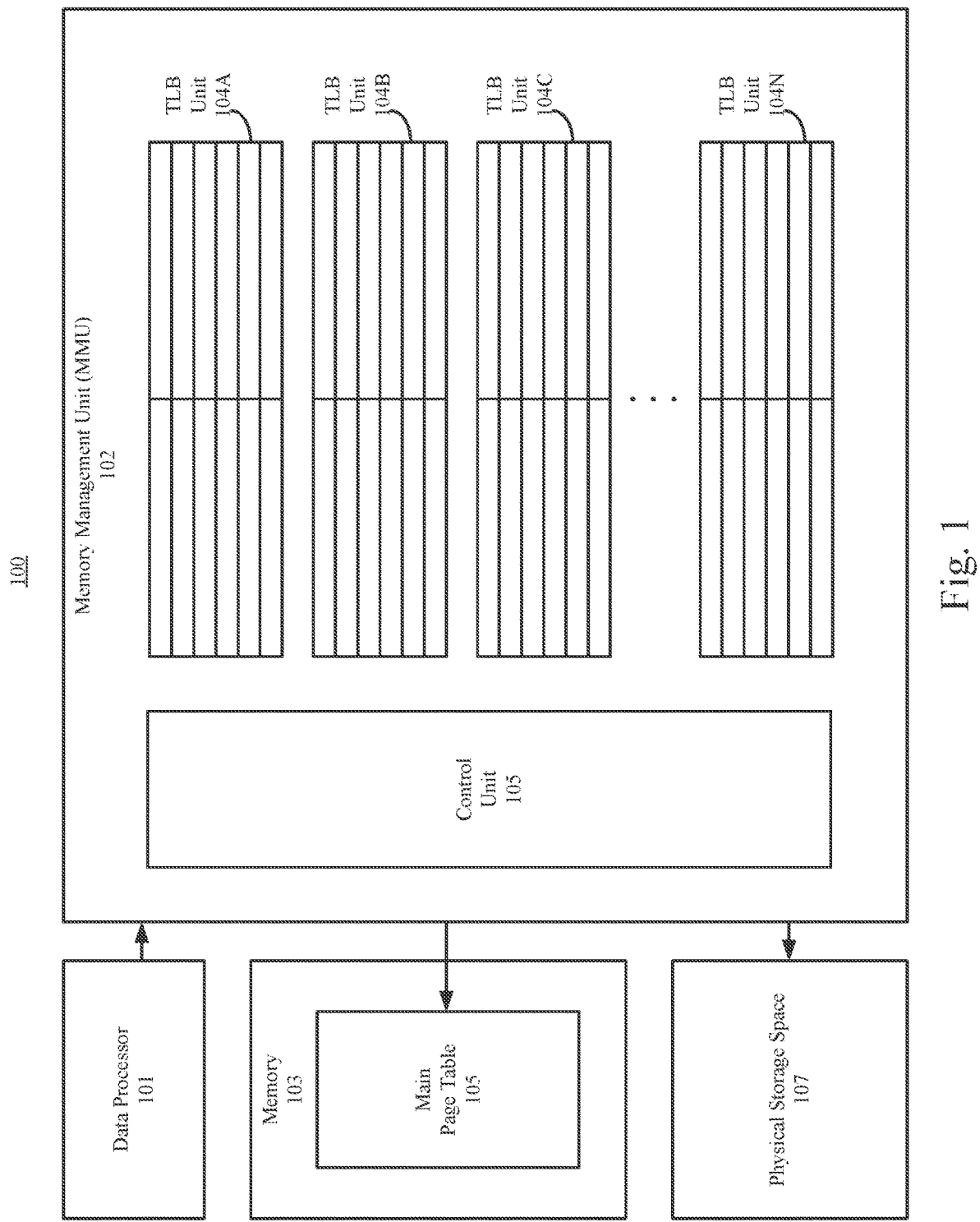
FIG. 1 illustrates a block diagram of an example neural network system by which TLB management may be implemented.

FIG. 1 illustrates a block diagram of an example neural network system 100 by which TLB management may be implemented.

As depicted, the example neural network system 100 may include a data processor 101, an MMU 102, and a memory 103. The MMU 102 may receive a virtual address from the data processor 101. The virtual address may include a stream ID, a virtual page number, and an offset. The stream ID may indicate one data type of the data stream. For example, the stream ID may be 00, 01, 11, or 00 and respectively indicate four data types in neural networks, e.g., input data, output data, weight values, and partial sums. In other streaming applications, the stream ID may include more than two bits and represent more different data types. In a non-limiting example, the virtual page number may include 20 bits and the offset may include 12 bits.

The MMU 102 may include a control unit 105 and one or more TLB units 104. A predetermined virtual storage space, e.g., a range of virtual addresses, into multiple portions. Each portion of the virtual storage space may be referred to as a page that may be associated with a page number. A physical storage space 107, e.g., a range of physical addresses, may be similarly divided into multiple portions. Each portion of the physical storage space may be referred to as a frame that may be associated with a frame number. A main page table may be configured to store the page numbers and the frame numbers. Each of the frame numbers may correspond to one of the page numbers. As such, a mapping from virtual addresses to physical addresses may be indicated by the main page table. The main page table may be stored in the memory 103.

Each of the TLB units 104 may be configured to store a part of the page numbers and the corresponding frame numbers. Upon receiving the virtual address, the control unit 105 may be configured to identify one of the TLB units 104 that corresponds to the stream ID in the virtual address (e.g., the TLB 104B). Further, the control unit 105 may determine whether one of the page numbers in the identified TLB unit (e.g., the TLB unit 104B) matches the virtual page number included in the virtual address. If yes, the control unit 105 may determine a TLB hit; otherwise, the control unit 105 may determine a TLB miss.

In a case of a TLB hit, the control unit 105 may be configured to identify the page number that matches the virtual page number and, accordingly, identify the frame number that corresponds to the identified page number. A physical address may be generated by the control unit 105 to include the identified frame number and the offset in the virtual address.

In a case of a TLB miss, the control unit 105 may be configured to access the main page table 105 in the memory 103 to identify a page number that matches the virtual page number in the virtual address. Similarly, a frame number that corresponds to the identified page number may also be identified in the main page table 105. A physical address may be generated by the control unit 105 to include the identified frame number and the offset in the virtual address. However, since the main page table 105 is maintained in the memory 103 external to the MMU 102, accessing the main page table 105 to retrieve the frame number may consume more time than accessing the TLB units 104 in the case of a TLB hit.

In either case of a TLB hit or a TLB miss, once the frame number for the physical address is identified, the control unit 105 may be further configured to update the page numbers in the TLB units 104 to increase the possibility of a TLB hit for a next virtual address.

Figure 2:
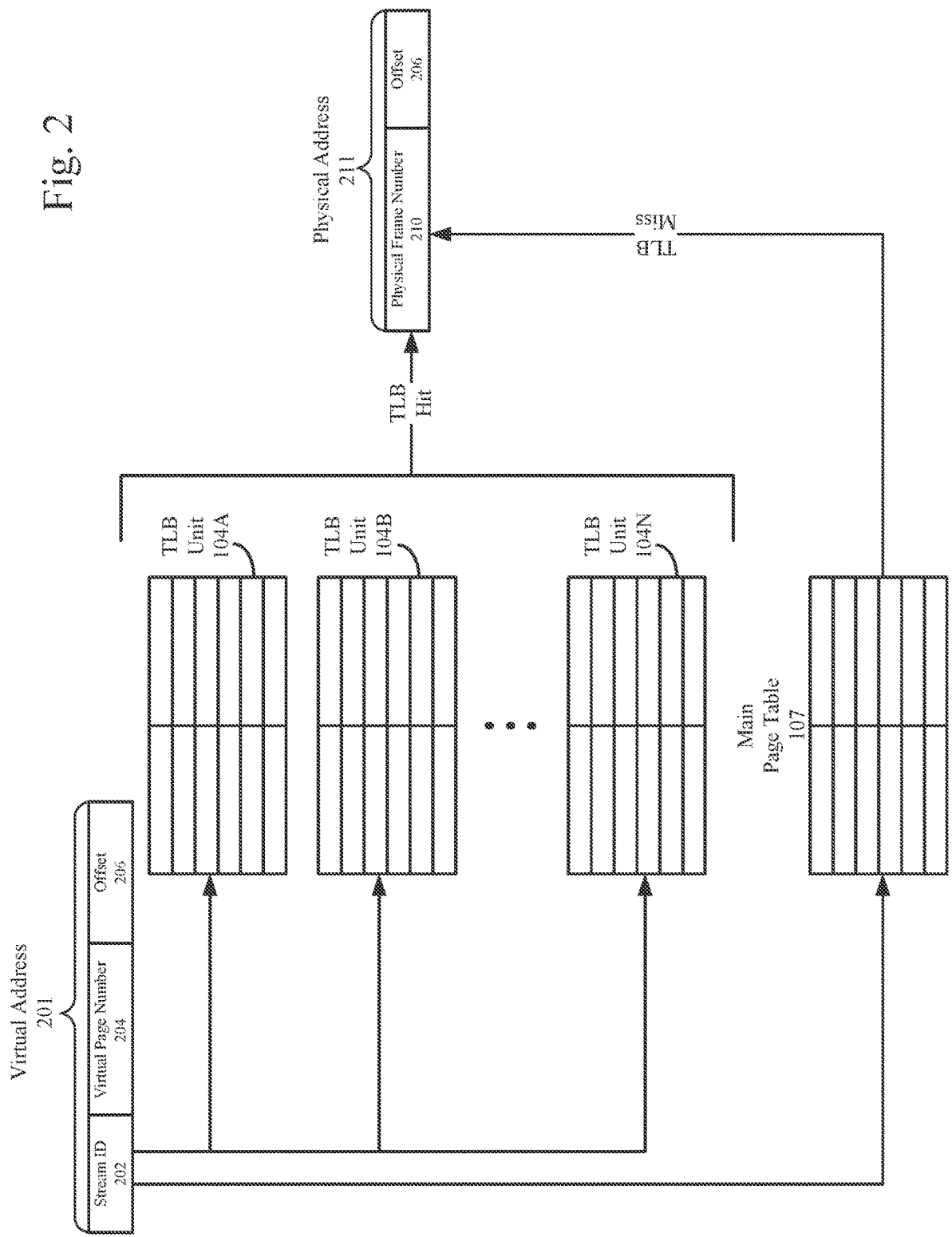
FIG. 2 illustrates a process for generating a physical address based on a received virtual address and entries stored in one or more TLB units.

FIG. 2 illustrates a process for generating a physical address based on a received virtual address and entries stored in one or more TLB units.

As depicted, the control unit 105 may receive a virtual address that includes a stream ID 202, a virtual page number 204, and an offset 206. The control unit 105 may be configured to first select one of the TLB units 104 based on the stream ID 202. Further, the control unit 105 may be configured to determine whether there is a page number in the selected TLB unit matches the virtual page number 204. That is, the control unit 105 may determine a TLB hit if a page number in the selected TLB unit matches the virtual page number 204. In the case of a TLB hit, the control unit 105 may be configured to identify the frame number that corresponds to the page number. The identified frame number may be included in a physical address 211 as a physical frame number 210. The physical address 211 may further include the offset 206.

If no page number in the selected TLB unit matches the virtual page number 204, the control unit 105 may determine a TLB miss. The control unit 105 may then access the main page table 107 in the memory 103 to identify a page number that matches the virtual page number 204 and a frame number that corresponds to the identified page number. Similarly, the frame number identified in the main page table 107 may be included in the physical address 211 as the physical frame number 210.

Figure 3:
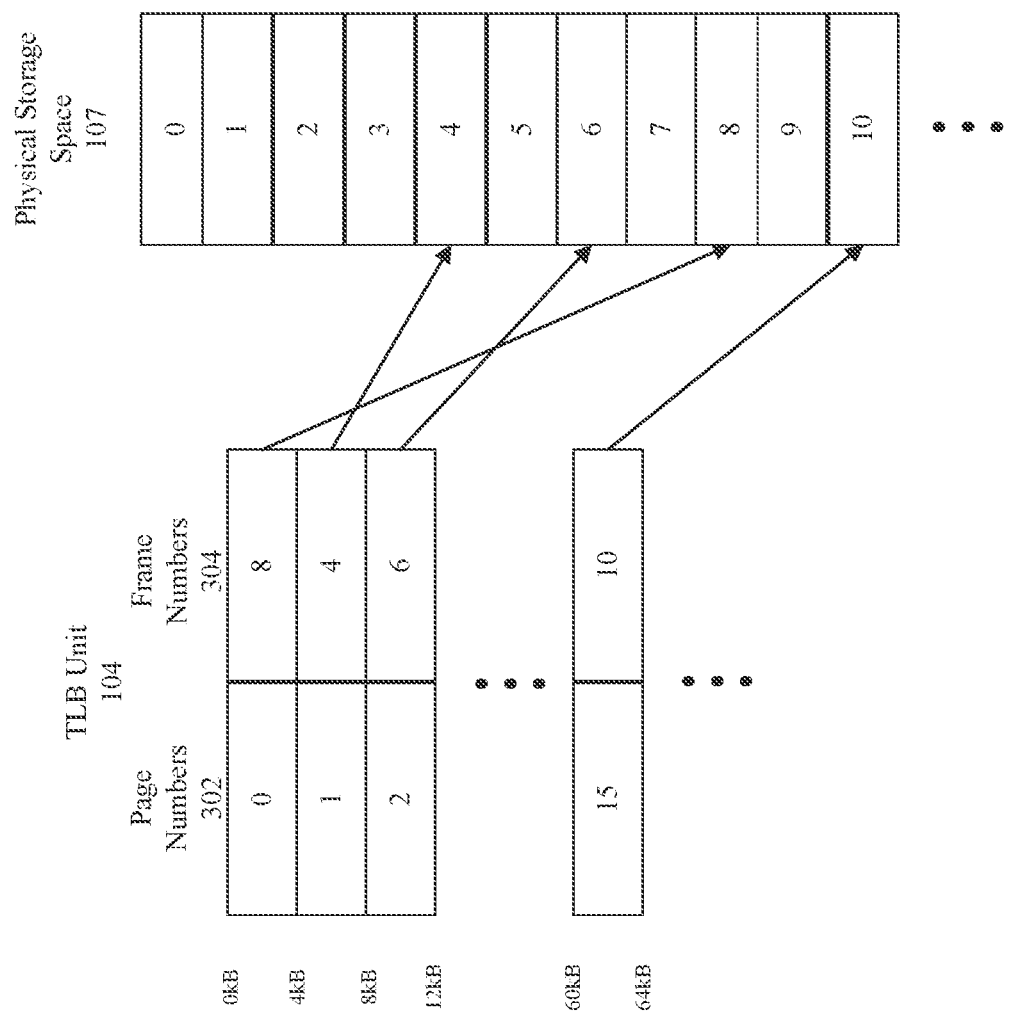
FIG. 3 illustrates a block diagram showing correspondences between page numbers, frame numbers, and physical addresses.

FIG. 3 illustrates a block diagram showing correspondences between page numbers, frame numbers, and physical addresses.

As depicted, each of the TLB units 104 may include multiple pages. Each page may represent a range of virtual addresses, e.g., 0 kB-4 kB, 8 kB-12 kB, etc. Each page may be associated with a page number 302. The example TLB unit 104 here is shown to include multiple consecutive pages, e.g., from page 0 to page 15. In some other examples, the TLB unit 104 may include pages that represent separate or random portions of virtual storage space, e.g., page 0, page 21, page 7, etc.

Further, the TLB unit 104 may include one or more frame numbers 304 that respectively correspond to the page number 302. Each of the frame numbers 304 may represent a portion in the physical storage space 107 as illustrated.

Figure 4:
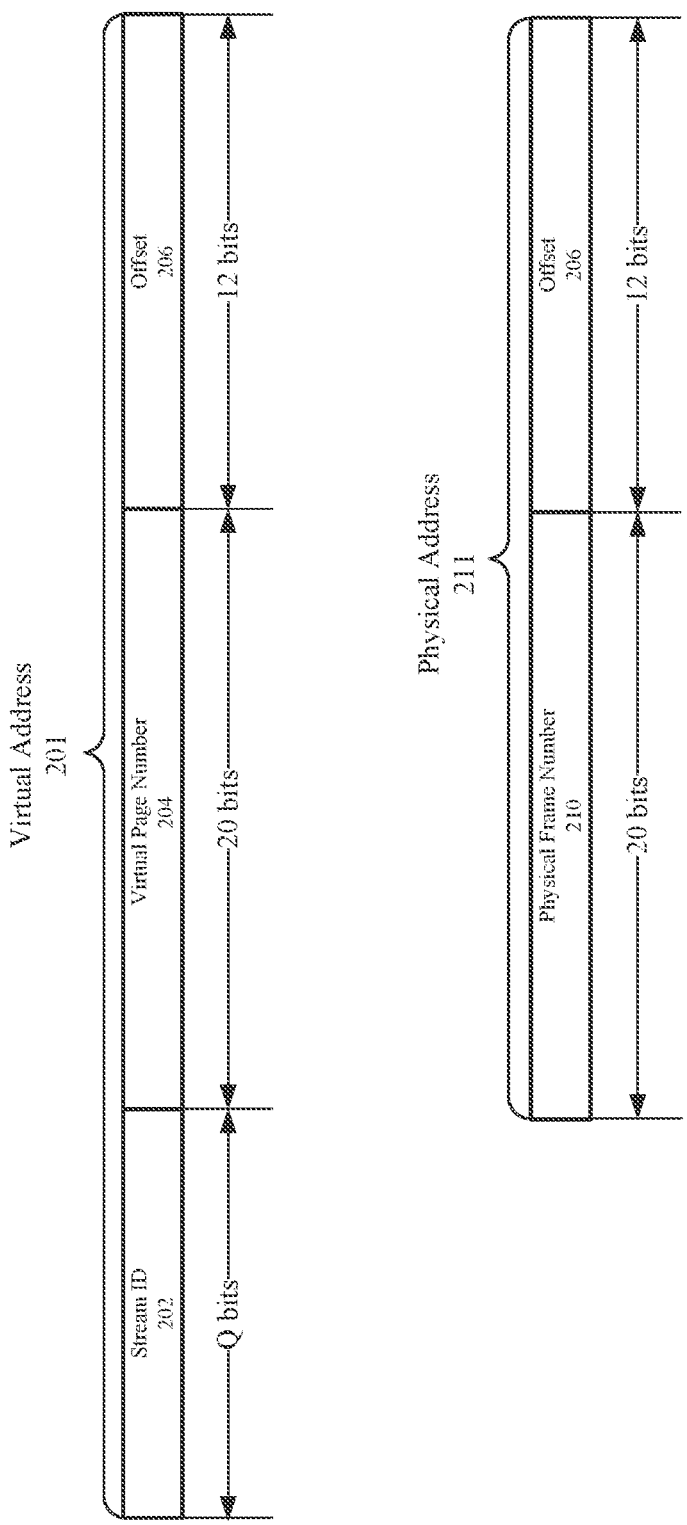
FIG. 4 illustrates an example virtual address and an example physical address.

FIG. 4 illustrates an example virtual address and an example physical address.

As shown, the virtual address 201 may include the stream ID 202, the virtual page number 204, and the offset 206. As described above, the virtual page number may include 20 bits and the offset 206 may include 12 bits. The bit width of the stream ID may be referred to as Q and may be determined in accordance with the following equation:

$$Q=\log_2 k$$

in which k refers to a count of the data types.

The physical address 211 may include the physical frame number 210 and the offset 206. The physical frame number 210 may also include 20 bits.

Figure 5:
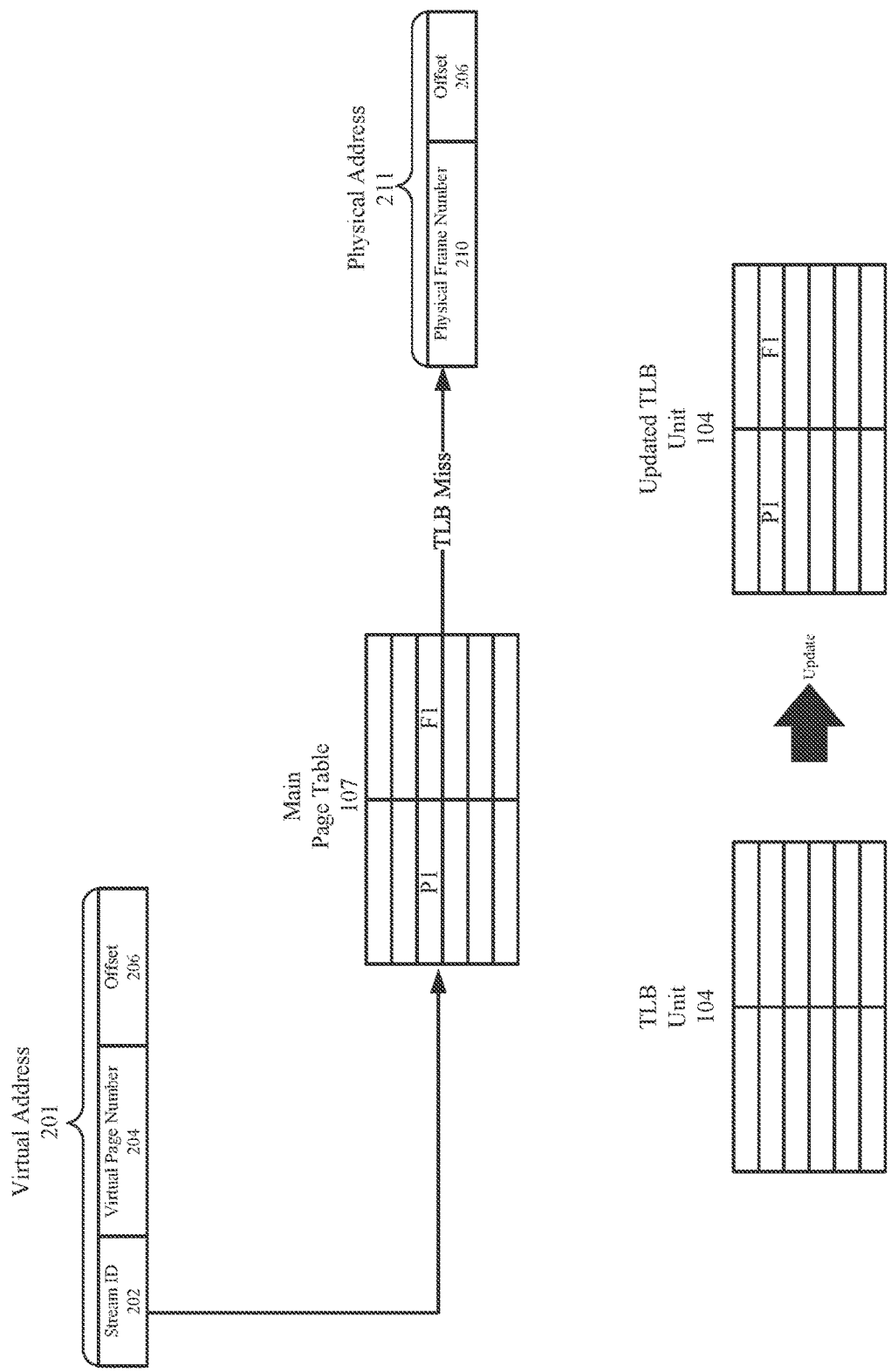
FIG. 5 illustrates a process of updating data entries in a TLB unit with respect to TLB management.

FIG. 5 illustrates a process of updating data entries in a TLB unit with respect to TLB management.

As depicted, the control unit 105 determines a TLB miss and access the main page table 107 to identify a page number that matches the virtual page number 204. A frame number F1 that corresponds to the identified page number P1 may be retrieved as the physical frame number 210.

Once the frame number F1 is retrieved or identified, the control unit 105 may be configured to update one of the TLB units 104 that corresponds to the stream ID 202.

In one example, the control unit 105 may be configured to randomly select a page number and a corresponding frame number in the TLB unit 104. Further, the control unit 105 may replace the selected page number with the identified page number P1 and replace the corresponding frame number with the identified frame number F1.

In other examples, the control unit 105 may be configured to identify a least recently accessed page number in the TLB unit 104 and the corresponding frame number. Similarly, the control unit 105 may replace the least recently accessed page number with the identified page number P1 and replace the corresponding frame number with the identified frame number F1.

Figure 6:
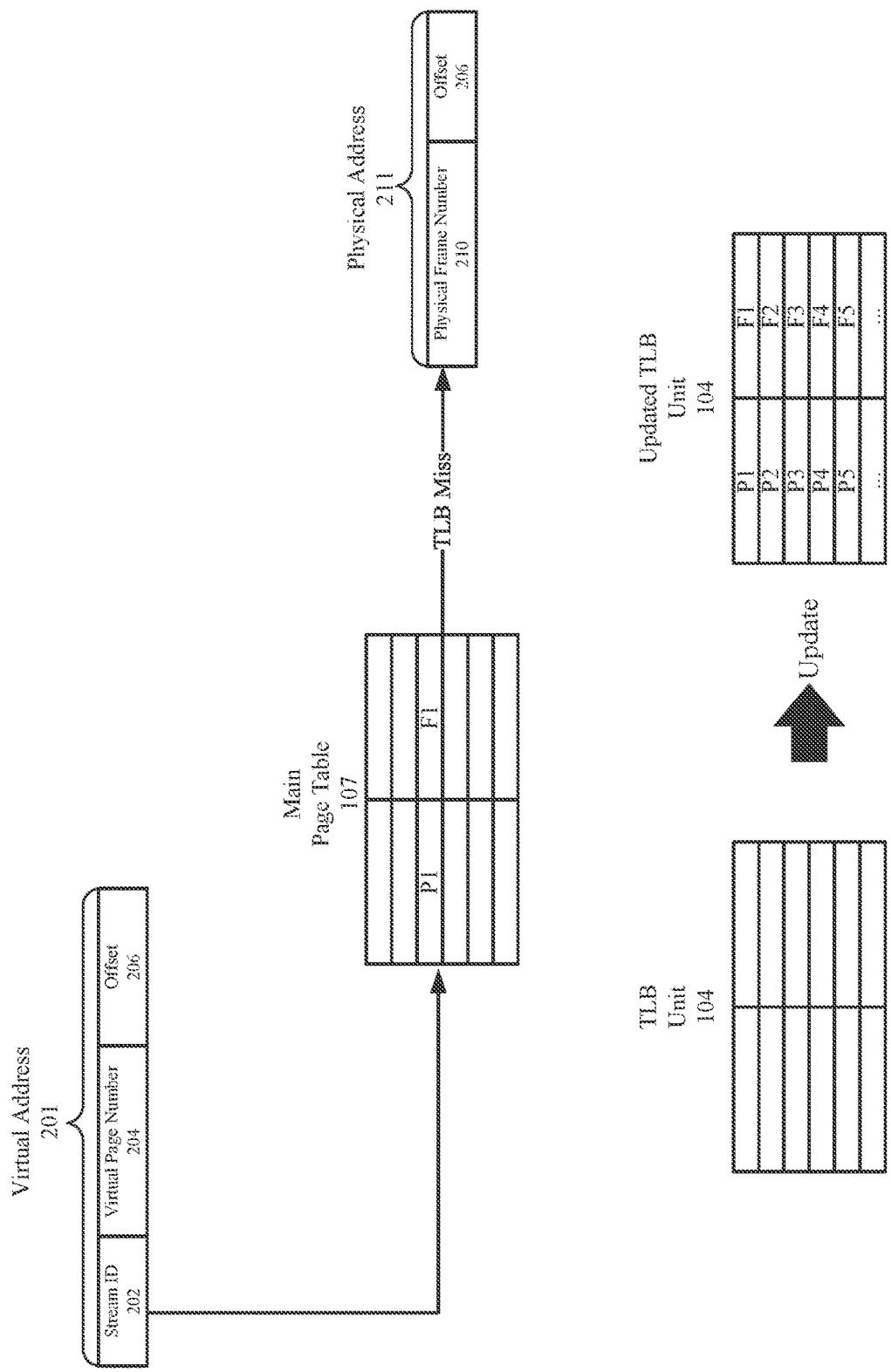
FIG. 6 illustrates another process of updating data entries in a TLB unit with respect to TLB management.

FIG. 6 illustrates another process of updating data entries in a TLB unit with respect to TLB management.

As depicted, the control unit 105 determines a TLB miss and access the main page table 107 to identify a page number that matches the virtual page number 204. Similar to the process in FIG. 5, a frame number F1 that corresponds to the identified page number P1 may be retrieved as the physical frame number 210.

Once the frame number F1 is retrieved or identified, the control unit 105 may be configured to update one of the TLB units 104 that corresponds to the stream ID 202.

In this example, the control unit 105 may be configured to replace all page numbers in the TLB unit 104 with those page numbers consecutively stored subsequent to the identified page number P1 in the main page table 107, e.g., P2, P3, P4, P5, etc. Similarly, the control unit 105 may be configured to replace all frame numbers in the TLB unit 104 with those frame numbers consecutively stored subsequent to the frame number F1, e.g., F2, F3, F4, F5, etc.

Figure 7:
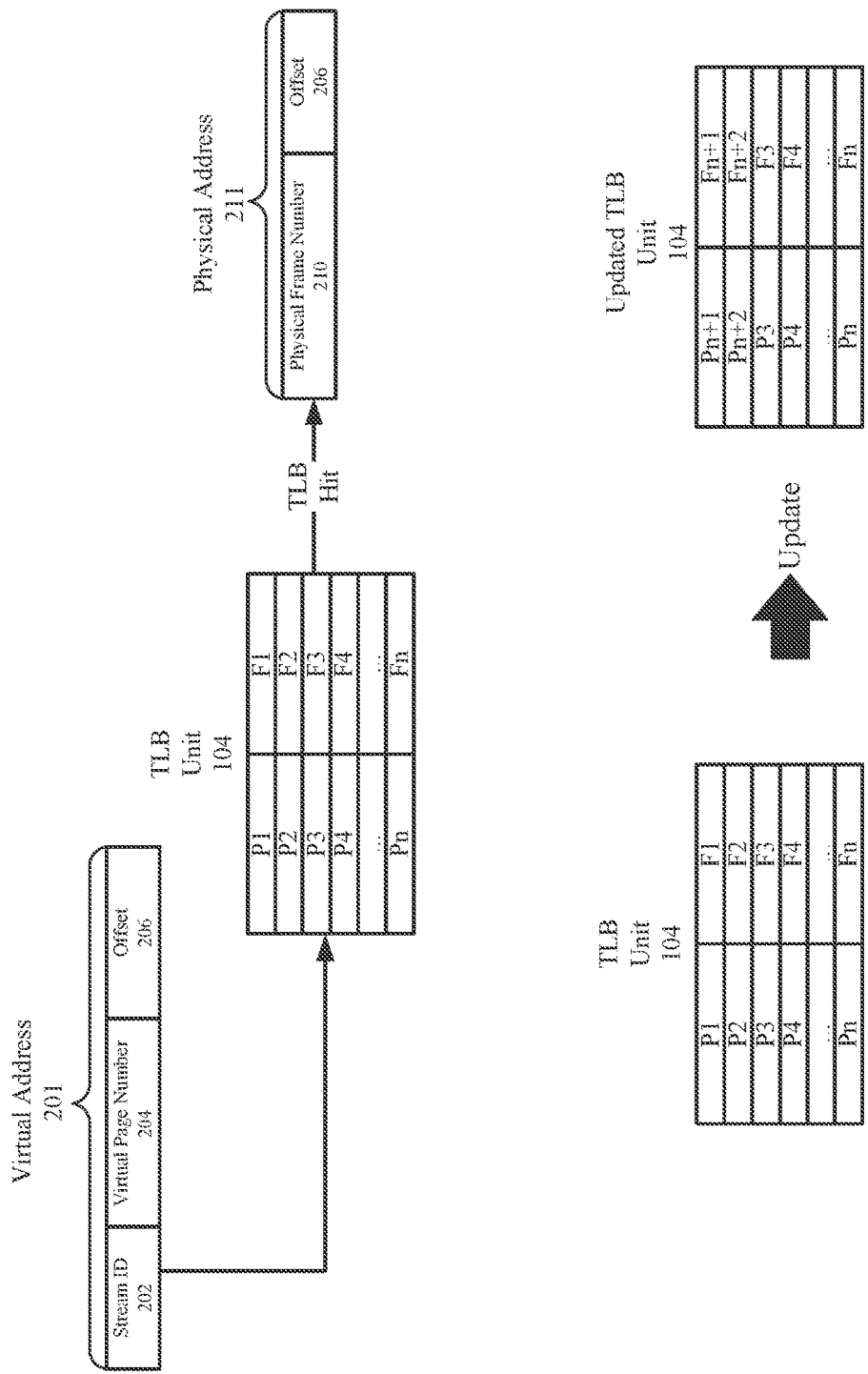
FIG. 7 illustrates another process of updating data entries in a TLB unit with respect to TLB management.

FIG. 7 illustrates another process of updating data entries in a TLB unit with respect to TLB management.

As depicted, the TLB unit 104 is configured to store one or more consecutive page numbers and corresponding frame numbers. When the control unit 105 determines a TLB hit, the control unit 105 may identify a page number that matches the virtual page number 204, for example, page number P2.

The control unit 105 may be configured to replace the identified page number P2 and all page numbers that precede the identified page number P2, e.g., P1, with the page numbers stored in the main page table 107 that are subsequent to the last page number in the TLB unit 104, e.g., Pn+1 and Pn+2. As shown, the control unit 105 may be configured to replace the page number P1 with the page number Pn+1 and replace the page number P2 with the page number Pn+2. Further, the control unit 105 may be configured to replace the frame number corresponding to the page number P1 with the frame number corresponding to the page number Pn+1. Similarly, the frame number F2 may be replaced with the frame number Fn+2.

As such, the updated TLB unit 104 may still include multiple page numbers that represent multiple consecutive portions of virtual storage space. Accordingly, the TLB hit rate for streaming applications that frequently access consecutive pages may be increased.

FIG. 8 illustrates a flow chart of an example method 800 for TLB management. The example method 800 may be performed by one or more components of the apparatus of FIG. 1.

At block 802, the example method 800 may include receiving, by a control unit, a virtual address that includes a stream ID, a virtual page number, and an offset, wherein the stream ID identifies one of multiple data types. For example, the control unit 105 may receive the virtual address 201 that includes the stream ID 202, the virtual page number 204, and the offset 206. The stream ID 202 may indicate one data type of the data stream. For example, the stream ID may be 00, 01, 11, or 00 and respectively indicate four data types in neural networks, e.g., input data, output data, weight values, and partial sums. In other streaming applications, the stream ID may include more than two bits and represent more different data types.

At block 804, the example method 800 may include identifying, by the control unit, one of one or more TLB units that corresponds to the stream ID in the virtual address. For example, the control unit 105 may be configured to identify one of the TLB units 104 that corresponds to the stream ID in the virtual address (e.g., the TLB 104B).

At block 806, the example method 800 may include determining a TLB hit when one of the plurality of page numbers in the identified TLB unit matches the virtual page number. For example, the control unit 105 may determine whether one of the page numbers in the identified TLB unit (e.g., the TLB unit 104B) matches the virtual page number included in the virtual address. If yes, the control unit 105 may determine a TLB hit; otherwise, the control unit 105 may determine a TLB miss.

At block 808, the example method 800 may include identifying, by the control unit based on the determination of the TLB hit, one of the plurality of page numbers that corresponds to the virtual page number in the virtual address. For example, in a case of a TLB hit, the control unit 105 may be configured to identify one of the page numbers in the TLB unit 104 that matches the virtual page number 204.

At block 810, the example method 800 may include identifying, by the control unit, the frame number that corresponds to the identified page number. For example, the control unit 105 may be configured to identify the frame number in the TLB unit 104 that corresponds to the identified page number.

At block 812, the example method 800 may include generating, by the control unit, a physical address that includes the frame number and the offset. For example, a physical address may be generated by the control unit 105 to include the identified frame number and the offset in the virtual address.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A memory management unit, comprising:
one or more Translation Lookaside Buffers (TLBs),
wherein each of the TLBs is assigned to only one of multiple data types, wherein the multiple data types include input data, output data, weight values, and partial sums in a neural network, and
wherein each of the TLBs includes a plurality of page numbers; and
a control unit configured to:
receive a virtual address that identifies one of the multiple data types,
identify one of the one or more TLBs that corresponds to the data type identified by the virtual address, and
determine a TLB hit based on the virtual address and the plurality of page numbers in the identified TLB.

2. The memory management unit of claim 1, wherein each of the TLBs includes a plurality of frame numbers that respectively correspond to the plurality of page numbers.

3. The memory management unit of claim 2, wherein the virtual address includes a stream identification (ID) that identifies the data type among the multiple data types.

4. The memory management unit of claim 3, wherein the virtual address further includes a virtual number.

5. The memory management unit of claim 4, wherein the control unit is configured to identify the TLB that corresponds to the stream ID in the virtual address.

6. The memory management unit of claim 4, wherein the control unit is configured to determine the TLB hit when one of the plurality of page numbers in the identified TLB matches the virtual page number in the virtual address.

7. The memory management unit of claim 6, wherein the control unit is further configured to, based on the determination of the TLB hit, identify one of the plurality of page numbers that corresponds to the virtual page number in the virtual address.

8. The memory management unit of claim 7, wherein the control unit is further configured to:
identify the frame number that corresponds to the identified page number, and
generate a physical address that includes the frame number and an offset included in the virtual address.

9. The memory management unit of claim 4, wherein the control unit is further configured to:
determine a TLB miss when none of the page numbers in the identified TLB matches the virtual page number in the virtual address,
based on the determination of the TLB miss, identify an alternative page number in a main page table stored in a memory external to the memory management unit, wherein the alternative page number corresponds to the virtual page number in the virtual address,
identify an alternative frame number that corresponds to the alternative page number,
generate an alternative physical address that includes the alternative frame number and an offset included in the virtual address, and
based on the determination of the TLB miss, identify one of the TLBs that corresponds to the stream ID in the virtual address,
identify a target page number from the plurality of page numbers in the identified TLB and a target frame number from the plurality of frame numbers that corresponds to the identified target page number, replace the target page number with the alternative page number, and replace the target frame number with the alternative frame number, wherein the target page number is randomly selected, and wherein the target page number is least recently accessed among the plurality of page numbers.

10. A method for managing TLBs, comprising:

receiving, by a control unit, a virtual address that identifies one of multiple data types, wherein the multiple data types include input data, output data, weight values, and partial sums in a neural network;

identifying, by the control unit, one of one or more TLBs that is only assigned to the data type identified by the virtual address, wherein each of the TLBs corresponds to one of the multiple data types, and wherein each of the TLBs includes a plurality page numbers; and determining a TLB hit based on the virtual address and the plurality of page numbers in the identified TLB.

11. The method of claim 10, each of the TLBs includes a plurality of frame numbers that respectively correspond to the plurality of page numbers.

12. The method of claim 11, wherein the virtual address includes a stream identification (ID) that identifies the data type among the multiple data types.

13. The method of claim 12, wherein the virtual address further includes a virtual number.

14. The method of claim 13, wherein the identifying further includes identifying the TLB that corresponds to the stream ID in the virtual address.

15. The method of claim 14, wherein the determining further includes determining the TLB hit when one of the plurality of page numbers in the identified TLB matches the virtual page number in the virtual address.

16. The method of claim 15, further comprising identifying, based on the determination of the TLB hit, one of the plurality of page numbers that corresponds to the virtual page number in the virtual address.

17. The method of claim 16, further comprising:

identifying the frame number that corresponds to the identified page number, and generating a physical address that includes the frame number and an offset included in the virtual address.

18. The method of claim 13, further comprising:

determining a TLB miss when none of the page numbers in the identified TLB matches the virtual page number in the virtual address, based on the determination of the TLB miss, identifying an alternative page number in a main page table stored in a memory external to the memory management unit, wherein the alternative page number corresponds to the virtual page number in the virtual address, identifying an alternative frame number that corresponds to the alternative page number, generating an alternative physical address that includes the alternative frame number and an offset included in the virtual address, based on the determination of the TLB miss, identifying one of the TLBs that corresponds to the stream ID in the virtual address, identifying a target page number from the plurality of page numbers in the identified TLB and a target frame number from the plurality of frame numbers that corresponds to the identified target page number, replacing the target page number with the alternative page number, and replacing the target frame number with the alternative frame number, wherein the target page number is randomly selected, and wherein the target page number is least recently accessed among the plurality of page numbers.

* * * * *